April 7, 1942. R. K. WINNING 2,278,629
THERMOSTATIC SWITCH AND AUTOMOBILE HEATER CONTROL CIRCUITS
Filed Oct. 24, 1938 3 Sheets-Sheet 1

INVENTOR.
ROBERT K. WINNING
BY
Wheeler, Wheeler & Wheeler
ATTORNEYS

April 7, 1942.   R. K. WINNING   2,278,629
THERMOSTATIC SWITCH AND AUTOMOBILE HEATER CONTROL CIRCUITS
Filed Oct. 24, 1938   3 Sheets-Sheet 2
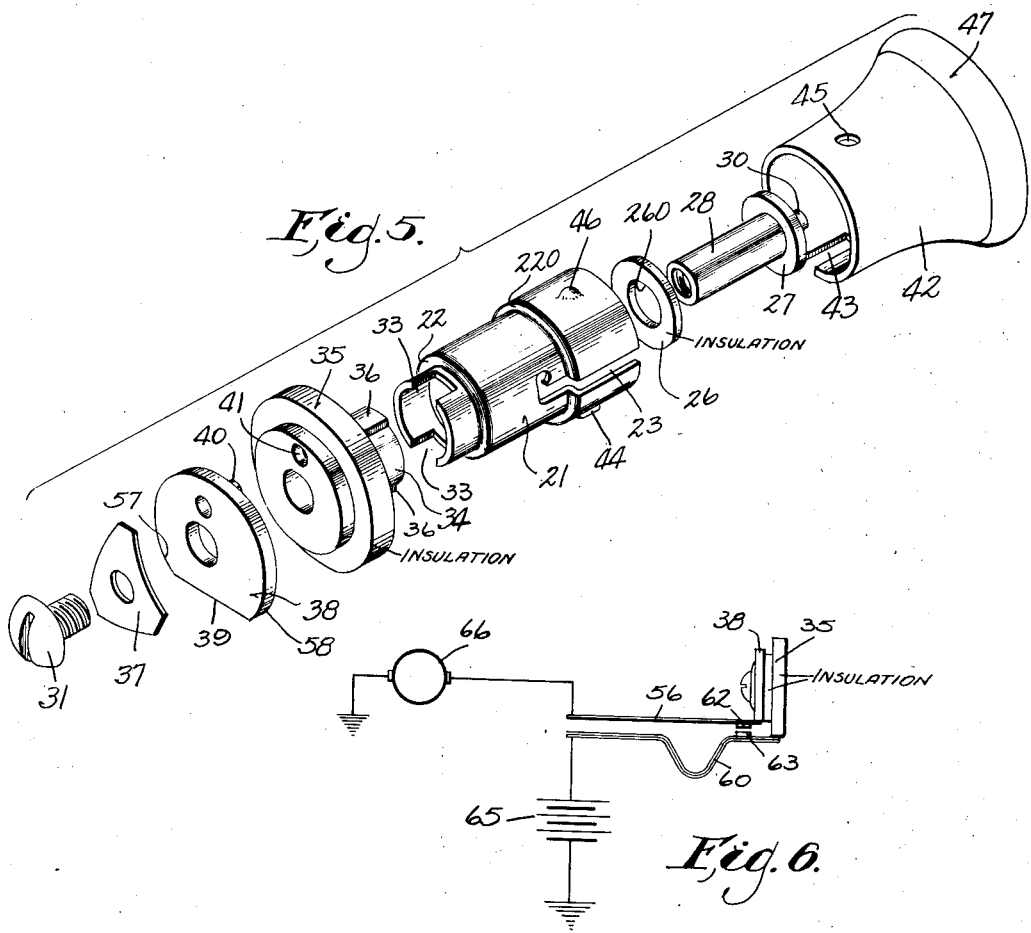
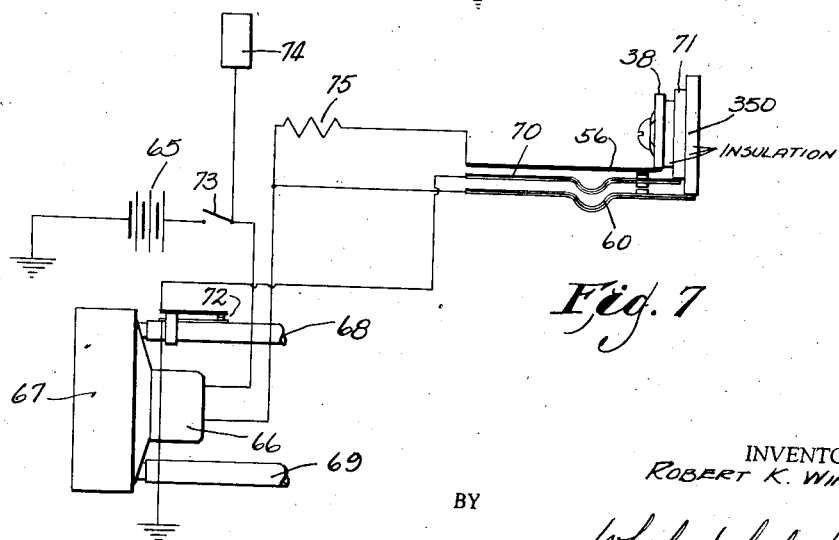
INVENTOR.
ROBERT K. WINNING
BY
Wheeler, Wheeler & Wheeler
ATTORNEYS.

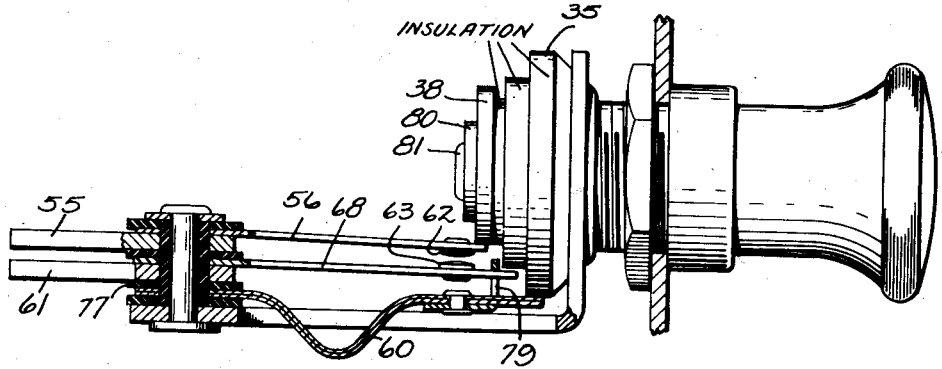
Fig. 8.
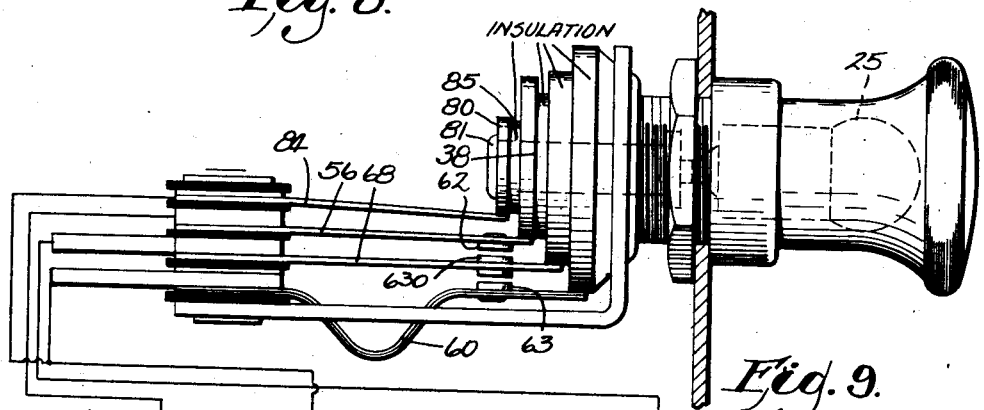
Fig. 9.
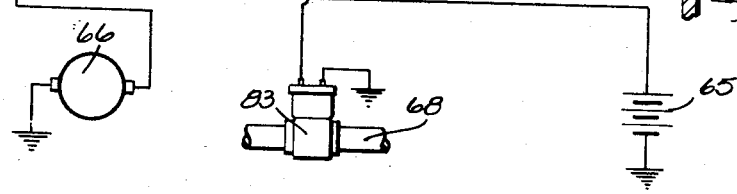
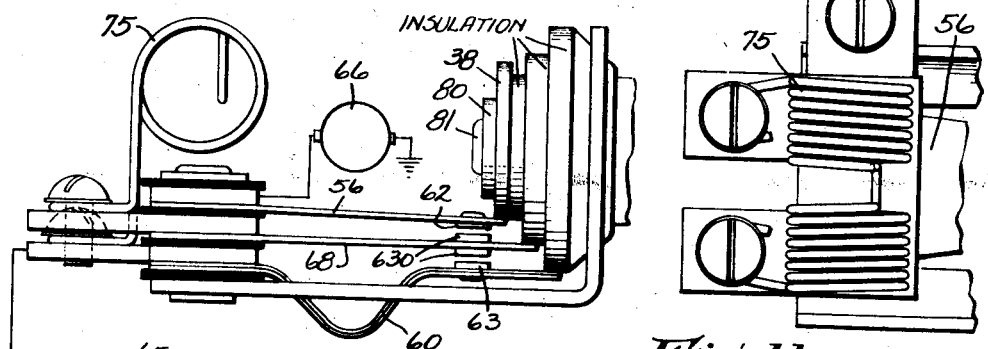
Fig. 10.    Fig. 11.
INVENTOR.
ROBERT K. WINNING Patented Apr. 7, 1942

2,278,629

UNITED STATES PATENT OFFICE 2,278,629

THERMOSTATIC SWITCH AND AUTOMOBILE HEATER CONTROL CIRCUITS

Robert K. Winning, Wauwatosa, Wis., assignor to Clum Manufacturing Company, Milwaukee, Wis., a corporation of Wisconsin Application October 24, 1938, Serial No. 236,615

2 Claims. (Cl. 200—138)

This invention relates to improvements in thermostatic switches and automobile heater control circuits.

It is the primary object of the invention to provide a novel and simple arrangement, particularly adapted for the control of an automobile heater thermostatically in accordance with the temperature in the interior of the automobile.

Another object of the invention is to provide a thermostatic device and circuit which controls a heater switch without the use of variable resistances but wherein a fixed resistance is automatically cut in or out of the circuit as required under the control of a dual thermostat adjustable to function at differing temperatures as desired.

It is a further object of the invention to provide a novel and improved type of switch in which a simple and inexpensive organization serves both for the manual switch control and the automatic thermostatic control of a heater circuit. The more specific objectives having to do with the detailed organization of the apparatus will be developed in the course of the following disclosure.

In the drawings:

Figure 5 is a view showing in perspective the various parts constituting the rotor of the apparatus as such parts appear when separated from each other.

Figure 6 is a diagrammatic view of the electrical circuit.

Figure 7 is a diagrammatic view of a modified electrical circuit and including a modified control mechanism, portions of which are illustrated in side elevation.

Figure 8 is a view principally in side elevation and partially in longitudinal section showing a further modified embodiment of the invention.

Figure 9 shows a further modified thermostatic appliance in side elevation, the connections thereto being diagrammatically illustrated.

Figure 10 is a fragmentary view, showing in side elevation a still further modified embodiment of the invention, the connections thereto being diagrammatically illustrated.

Figure 11 is a fragmentary detail view, in plan, of the terminal portion of the device shown in Figure 10.

Like parts are identified by the same reference characters throughout the several views.

Figures 1, 2, 3, 4:
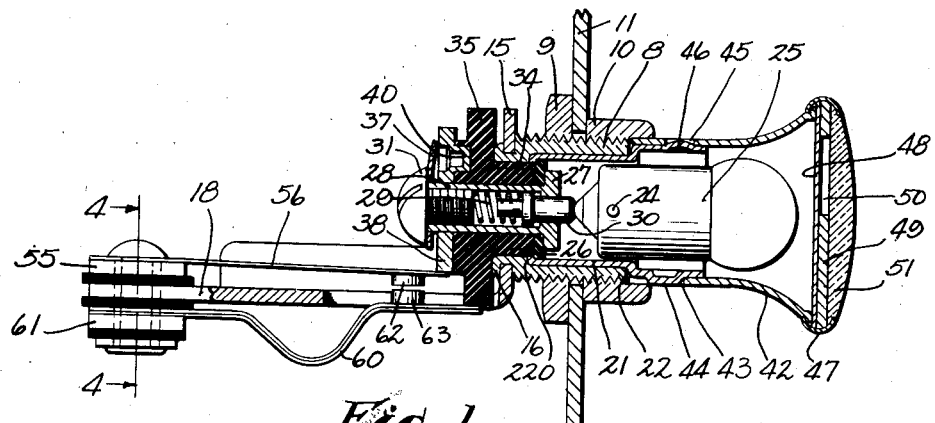
Figure 1 is a view of my improved thermostatic switch in longitudinal section.
Figure 2 is a view of the apparatus in plan.
Figure 3 is a view of the apparatus in front elevation.
Figure 4 is a view of the apparatus in rear elevation.

The device is adapted for "single hole mounting." It includes a bushing at 8 and an interior bearing surface for the rotor and externally threaded to receive the clamping nuts 9 and 10 which are shown in Figure 1 engaged with the apertured panel 11 through which the bushing 8 extends.

At its rear end the bushing 8 is shouldered to provide a seat for the bracket 15. The bracket is apertured to engage the reduced portion of the bushing and the aforesaid bushing portion is upset at 16 to rivet the bracket permanently to the bushing. The portion of the bracket so connected with the bushing has an upstanding flange 17 with which the base 18 and side flanges 19 and 20 are integrally connected.

The rotor which turns within the bushing 8 is assembled upon the lamp socket member 21 which is made of light metal in a generally tubular form in three diameters, being shouldered at 22 and 220. It is provided at 23 with the usual bayonet slot for the bayonet pin 24 of a conventional lamp 25, the base of which fits within the intermediate portion of the socket member 21. A washer 26 internally apertured at 260 supports the head 27 of the tubular bolt 28 within which the compression spring 29 acts on the plunger 30 which engages the central contact of the lamp.

Spring 29 is maintained under compression by the screw 31 with which the tubular bolt 28 is threadedly engaged to maintain the parts in assembly.

The smallest diametered portion of the lamp socket 21 is notched at 33. Fitted within the notch is the boss 34 of the insulating disk 35, such boss being provided with lugs at 36 engaged within the notches 33 to key the dielectric member 35 to the lamp socket member 21 for rotation therewith.

The spring washer 37 engaged by the head of screw 31 holds to the rear face of the dielectric member 35 a metal cam 38, having a flat side at 39 and provided integrally at 40 with a projection received into the aperture 41 of dielectric member 35 to constrain the cam to rotate with the disk and the lamp socket member. The dielectric disk bears against the end of bushing 8, and the spring washer 37 takes up all play in maintaining the parts taut against rattle and accidental rotative displacement.

Motion is transmitted to the cam through the lamp socket member by a handle which comprises a hollow metal fitting 42, notched at 43 to receive the key 44 which is integral with the lamp socket member. The metal fitting 42 is also apertured at 45 to receive the protuberance 46 which is pressed out of the lamp socket member to constitute a detent for holding the handle in assembly thereon.

At its end the handle member 42 is flanged outwardly and a bezel ring 47, spun over the flange, holds a three-ply head in place at the end of the handle. The inner ply 48 may constitute a transparent colored member which may be made of colored celluloid or other transparent, colored plastics. The disk shown at 49 constitutes a stencil which may have an opening at 50 in the form of an arrow or other figure to expose the colored ply 48 when the light shines therethrough. Over these two plies is a window ply 51, preferably lens shaped, which is likewise transparent and may be made of glass or plastic through which the aperture 50 of the stencil is visible, as shown in the colored light transmitted through the colored ply 48 when the lamp is in operation.

The handle as a whole is readily detachable from the lamp socket member to permit lamp replacement, but when in place thereon, as shown, it will positively transmit rotative movement from the handle through the lamp socket member to the cam 38.

Insulated from the base portion 18 of the bracket 15 is a terminal 55 to which the contact spring 56 is connected. This spring is biased for upward movement to the full extent permitted by engagement of its end with the cam 38. The cam 38 has a helical periphery from the relatively short radius portion 57 toward the relatively long radius portion 58. Thus, the rotation of the handle in the manner above described will move the end of contact spring 56 upwardly and downwardly according to the rotative position of the handle.

Likewise insulated from the bracket is a bi-metallic thermostatic element 60 provided with a terminal at 61 and having its free end engaged with the insulating disk 35 as a stop which limits the upward movement of the bi-metallic thermostatic element in response to temperature reduction. From this stop, constituted by the insulating disk 35, the free end of the bi-metallic bar 60 will move downwardly with an increase in temperature from the predetermined minimum at which the bar will commence to move. Contact spring 56 carries a contact 62. The bi-metallic element 60 carries a co-acting contact 63. When the rotative position of cam 38 is such that its flat under surface 39 engages spring 56 the contacts 62 and 63 will be separated.

As the cam is rotated by the handle, the spring 56 will be deflected until contact 62 engages contact 63 to close a circuit between terminals 55 and 61. This will open the hot water valve or start the fan motor, according to the connections employed, and the heating operation will continue until the heat is such as to warp the bi-metallic bar 60 downwardly, thereby moving contact 63 away from contact 62 and thus interrupt the heat circuit.

According to the rotative position of the cam the heating switch, comprising contacts 62 and 63, will open at any desired temperature within the range of the device. The greater the radius of the peripheral portion of the cam, which is engaged with spring 56, the higher will be the temperature at which the contact points will separate.

The connections to the device may be such that the lamp 25 will be illuminated whenever the contacts 62 and 63 are engaged, the lamp being extinguished whenever such contacts separate. Thus, in Figure 6 I have shown a circuit in which the battery 65 has one side grounded and the other side connected to the bi-metallic bar 60. The stop engaged by the free end of the bar is the dielectric disk 35 so that no current is communicated from the bar until the contacts 62 and 63 are engaged. At that time a circuit is completed not only to the heating motor or other appliances 66 and thence to ground, but, in addition, a contact is completed through the metallic cam 38, a bolt 27, and pin 30 to the central pole of the lamp 25, the base of which is grounded through the lamp socket member 20 and the panel 11.

Figure 7 shows an alternative arrangement employing a supplemental bi-metallic bar at 70 intervening between the bi-metallic bar 60 and the spring 56. The disk 350 in such a case is modified to provide a separate shoulder at 71 to be engaged as a stop by the free end of the bi-metallic bar 70. In this instance also the heating device is typified by a motor at 66 which may be assumed to operate in the usual way to drive a fan in the heating radiator casing 67, the radiator core in such casing (not shown) being supplied with hot water through pipe 68 and provided with a return through pipe 69.

This arrangement is devised to shut off the current automatically when the vehicle engine is not in operation, or, for some other reason, the water supplied through pipe 68 becomes chilled. A separate thermostatic switch is provided at 72, and the entire arrangement is connected to battery 65 through the ignition switch 73 which supplies the ignition coil 74. When the ignition switch is closed the current passes to motor 66 and thence to spring 56. Unless spring 56 is deflected by the control cam 38 as previously described the motor will not operate, but if the spring 56 is deflected to close the circuit to the intermediate bi-metallic bar 70 the circuit will then be closed through the motor to ground, provided the thermostatic switch 72 is closed. Until the water is warm, however, the thermostatic switch 72 will remain open. Consequently, regardless of the temperatures to which thermostatic bar 70 may be subject, the fan of the heater 67 will not start until the water is sufficiently warm to make the fan effective for heating.

When it does start, it will operate at a relatively low speed because of the resistance incorporated in the circuit at 75, but if the cam 38 is rotated to its extreme position it will close the circuit not only to the intermediate bi-metallic bar at 70, but, by physically deflecting such bar, it will close the circuit to the bi-metallic bar 60 which is so connected as to cut out resistance 75. Thus, where a substantial increase in temperature is desired the fan will operate at full speed.

The construction shown in Figure 8 is essentially identical in principle to that shown in Figures 1 to 6. The bi-metallic bar 60, however, carries no current, being fully isolated from contact 61 by the intervening dielectric washer at 77. In this construction the terminal 61 is provided with a contact spring at 68, on which the contact 63 is mounted to be engaged by contact 62 of spring 56 in the manner above described. When the temperature rises the bi-metallic bar 60 pulls the spring 68 by means of yoke 79 to separate contacts 63 and 62, thereby opening the circuit. The spring washer and screws 37 and 31, as above described, may be omitted and in lieu thereof an ordinary washer 80 is engaged by a rivet head 81 which replaces the screw.

In the construction shown in Figure 9, the battery 65 supplies current to the spring arm 68. The cam 38 first forces spring arm 56 downwardly to close the circuit through contacts 62 and 630 to energize the fan motor 66. The continued operation of the cam forces both spring arms 56 and 68 downwardly into engagement with the contact 63 of the bi-metallic bar 60. This energizes the solenoid valve diagrammatically indicated at 83 to open such valve to permit the heating liquid to flow through pipe 68.

When the temperature is raised sufficiently the bi-metallic bar 60 will move to open the circuit controlling the solenoid valve and will allow such valve to be closed. As is usual in such valves, the valve is self closing, and is held open only when energized.

The spring arm 84 has no function other than to engage the washer 80 to energize the pilot light within the handle. In this instance the washer 80 is insulated from cam 38 by means of an interposed dielectric disk at 85. The spring arm 84 is connected in parallel with the circuit which energized the solenoid valve 83.

In the construction shown in Figures 10 and 11 the resistance coil 75 is connected between the bi-metallic bar 60 and the spring arm 68. As in the construction shown in Figure 9, the spring arm 56 is acted on by the cam and serves simply as a switch, cam controlled in the initial rotation of the knob, to close the circuit to the motor 66 through contacts 62 and 630. The disk 80 being in direct metallic contact with cam 38 will also energize the pilot lamp in the handle in this particular device. The current to the fan motor of the heater must, however, pass through coil 75 except when such coil is cut out by engagement of contact 630 with the contact 63 of the bi-metallic bar 60. Thus, the motor operates at slow speed, by reason of the resistance 75, unless the car body or other enclosure in which the mechanism is operated cools off below the temperature for which the cam is adjusted. When the temperature falls to this predetermined minimum the contact 63 will be moved by the thermostatic bar into engagement with contact 630 to short circuit coil 75, thus subjecting the motor 66 of the heater fan to full battery voltage to operate it at high speed until the temperature is raised sufficiently so that bar 60 reopens the contact at 63.

From the foregoing it will be noted that it is broadly immaterial how the heating appliance is controlled, whether by control of the fan which circulates air across the heater, or whether by control of a valve which admits the heating liquid to the radiator, or whether by any one of a number of other possible arrangements.

It is also broadly immaterial whether the heating control is made to operate at full intensity in the first instance and to be reduced in intensity when a desired temperature is reached, or whether the converse hook-up is employed.

In each of the various constructions disclosed, however, it will be observed that I have combined a switching mechanism with a thermostatic control mechanism, subject to manipulation by a single handle, the whole device being such as to be adapted for mounting on the instrument panel of a motor vehicle and particularly designed to control the heating of such a vehicle.

The provision of a dielectric stop engaged by the thermostatic element to define its extreme position when cold, no matter how low the temperature may drop, not only protects the device against waste of battery current when the car is left in the cold, but also permits the cam operated spring arm to function as a switch, the arrangement in each case being such that when such arm is engaged with the flattened portion of the cam it is definitely removed from the possibility of contact with the thermostat in the extreme position of the thermostat defined by said stop.

I claim:

1. In a device of the character described, the combination with a rotor provided with a cam having a peripheral surface of variable radius and provided adjacent said cam with a dielectric disk constituting a stop projecting beyond said radius, a bracket, a thermostat mounted on said bracket and having a free contact portion engageable with said stop to define an extreme position, said thermostat being movable from said position upon an increase in temperature, and means for manually rotating the periphery of said cam in a direction to advance the radius of said cam toward said thermostat, and contact means engageable with the thermostat and from which the thermostat is disengageable upon its movement from said stop.

2. The combination with a plurality of arms, each provided with free end portions having contacts, one of said arms constituting a thermostat, of dielectric means providing stops limiting the movement of two of said arms, including said thermostat, to define extreme positions thereof with their respective contacts in mutually spaced relation, cam means defining a position of another of said arms, said last mentioned arm being biased for engagement with the cam means and said cam means having one portion engageable with said last mentioned arm to define a position in which the contact of the last arm is spaced from the contact of the adjacent arm, and a handle in operative connection with said cam means for the movement thereof in a direction to engage the contact of the last arm with the contact of the next adjacent arm and to engage the contact of the next adjacent arm with another contact of a successively adjacent arm, said thermostat being operatively connected to break certain of said contacts upon movement from said stop upon an increase in temperature.

ROBERT K. WINNING.